United States Patent [19]

Dessouroux

[11] 4,252,167
[45] Feb. 24, 1981

[54] DEVICE FOR POSITIVELY LOCKING A SCREW IN A TAPPED HOLE

[75] Inventor: Alexis Dessouroux, Petit-Rechain, Belgium

[73] Assignee: Shur-Lok International S.A., Belgium

[21] Appl. No.: 964,807

[22] Filed: Nov. 29, 1978

[30] Foreign Application Priority Data

Dec. 7, 1977 [FR] France .............................. 77 36874

[51] Int. Cl.³ ........................................... F16B 39/02
[52] U.S. Cl. ...................................... 411/83; 403/19; 411/263; 411/293; 411/312; 411/321
[58] Field of Search ...................... 151/8, 16, 15, 2 R, 151/28, 27, 23, 70, 33, 54, 5

[56] References Cited

U.S. PATENT DOCUMENTS

| 501,345 | 7/1893 | Holmes | 151/16 X |
|---|---|---|---|
| 965,445 | 7/1910 | Davis | 151/8 |
| 1,413,024 | 4/1922 | Harrell | 151/16 |
| 2,147,899 | 2/1939 | Hoern | 151/70 UX |
| 3,104,493 | 9/1963 | Nalle | 151/70 UX |
| 3,630,261 | 12/1971 | Gley | 151/70 |

FOREIGN PATENT DOCUMENTS 146738 8/1954 Sweden ....................................... 151/8

Primary Examiner—Ramon S. Britts
Attorney, Agent, or Firm—Holman & Stern

[57] ABSTRACT

The device comprises in combination a screwthreaded block and a screw which are hollow and have screwthreads of opposite direction. These screwthreads cooperate with screwthreads of respectively corresponding direction formed in the inner wall of the tapped hole. There are provided means for stopping the block, and means for preventing rotation between the block and the screw.

9 Claims, 2 Drawing Figures

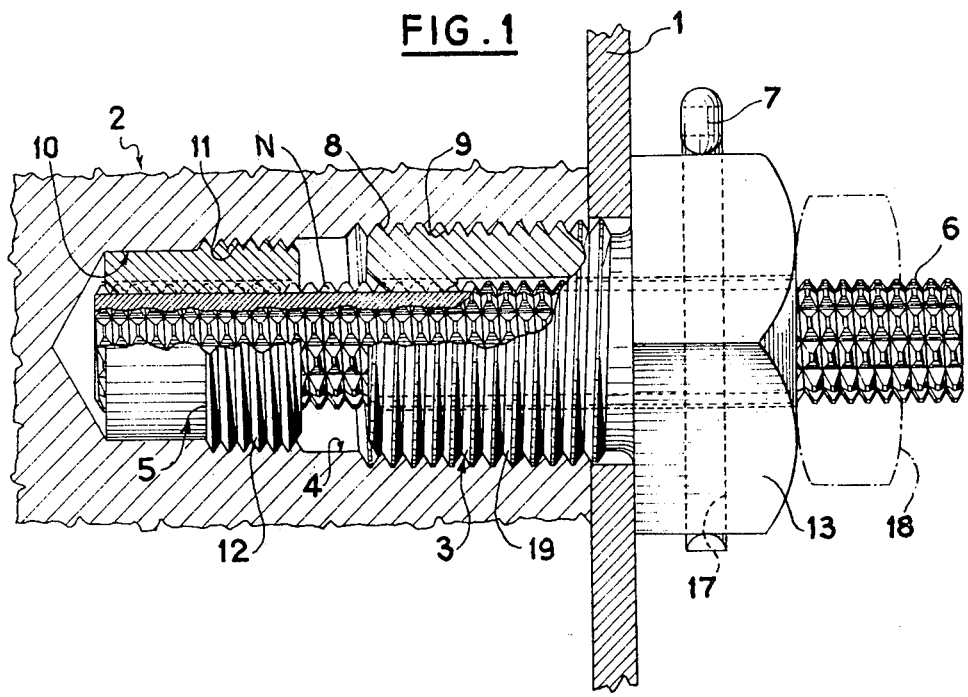
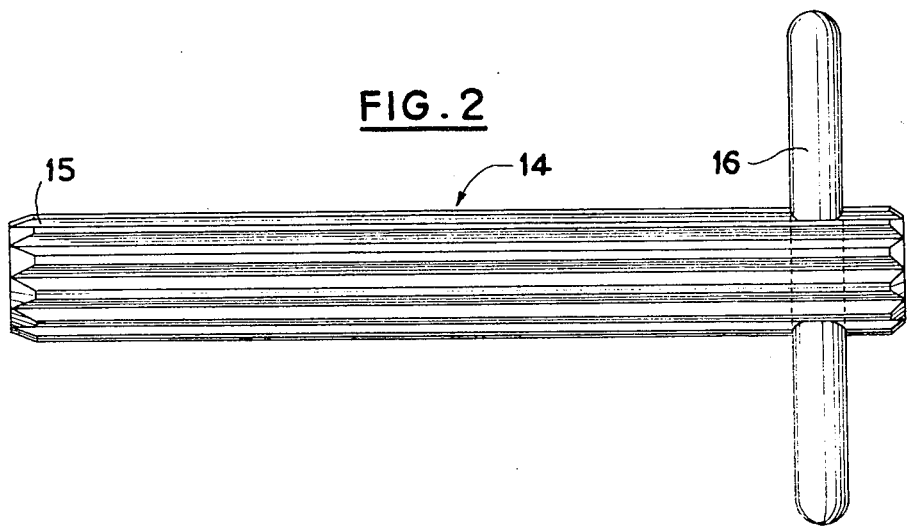

DEVICE FOR POSITIVELY LOCKING A SCREW IN A TAPPED HOLE

DESCRIPTION

The present invention relates to a device for locking a screw in a hole and in particular, although not exclusively, in a blind hole.

Indeed, in many applications, a first part must be secured to a second part by means of a screw which extends through the first part and is screwed in a tapped hole in the second part. It is also frequently necessary that this assembling screw be tightened and locked at a desired torque which must be maintained irrespective of the imposed working conditions.

For this purpose, the screw must be retained against rotation so as to prevent it from being unscrewed. This retaining action is easily achieved when the hole extends through the second part and there exist for this purpose various systems or devices which are well known in the art.

Various devices are known in which a system of screwthreads in opposite directions are employed for locking an assembling means which holds a plurality of parts fixed together.

U.S. Pat. No. 1,877,665 discloses a relatively complicated device in which the assembling means is a screw on which there is screwed a nut having parts which are screwthreaded in different directions, the screw having one end of polygonal cross-sectional shape with which cooperates a lock nut which has an opening of complementary shape which prevents it from rotating. The nuts must be rendered rigid with each other and with the screw.

U.S. Pat. No. 1,734,743 discloses a simpler arrangement in which the assembling means is a screw comprising two screwthreads in opposite directions, the second screwthread adjacent the end of the screw having a reduced diameter. Two nuts which are complementary to the screwthreads are rendered rigid with each other and with the screw.

These two devices can only be applied if it is possible to have easy access to the two ends of the assembling means for rendering the locking means rigid.

On the other hand, no means are known which are both effective and simple to use when the assembling means must be fixed in a blind hole so that its end is inaccessible.

An object of the invention is to satisfy this need by providing a simple practical and effective device for locking a screw in a positive manner with a desired torque, without allowing the screw any possibility of unscrewing itself irrespective of the working conditions, in a tapped hole which is or is not blind.

According to the invention, there is provided a device for locking a screw in a tapped hole, comprising in combination a screwthreaded block and a screw having screwthreads of opposite direction cooperating with screwthreads of respectively corresponding direction formed in an inner wall of the hole, stop means for the block, and means for preventing rotation between the block and the screw.

According to another feature of the invention, the screwthreaded block is hollow and its screwthread is an external screwthread and has a right-hand screwthread and had N axial splines in its inner surface.

According to a further feature of the invention, the screw is hollow and its screwthread is an external left hand screwthread and it comprises N axial splines in its inner surface.

In one embodiment, the tapped hole has in the vicinity of the end thereof opposed to the entrance of the screw, a first right-hand screwthread and, at the end thereof corresponding to the entrance of the screw, a second left-hand screwthread of larger diameter, the start of the first screwthread being spaced from the end of the second screwthread.

According to another feature of the invention, said means for preventing the rotation between the block and and screw comprise a rod having N axial splines adapted to cooperate with both the inner splines of the block and screw.

Further features and advantages of the invention will be apparent from the ensuing description with reference to the accompanying drawing which is given solely by way of example and in which:

FIG. 1 is a partial longitudinal sectional view of a device for locking a screw in a tapped hole according to the invention, showing the locked position of the screw, and FIG. 2 is a side elevational view of a T for placing in position the locking block of the device shown in FIG. 1.

With reference to the drawing, reference numeral 1 designates a first part or number which, in this embodiment, is a simple plate, reference numeral 2 designates a second part or member which is of large volume on which the part 1 is secured by means of a screw 3 in a tapped hole 4 in the part 2.

The device according to the invention for locking the screw 3 with a given tightening torque comprises, in addition to a block 5, a screwthreaded keying rod 6 and a pin 7.

The hole 4 has a first part 8 in the inner surface of which is tapped a screwthreaded 9 which in the presently described embodiment is a left-hand screwthread and a second portion 10 of smaller diameter in the inner surface of which is tapped a screwthread 11 which is in this embodiment a right-hand screwthread which does not extend completely to the end of the blind hole 4 and starts at a distance from the end of the screwthread 9. An annular radially inwardly extending shoulder 11a facing the entrance end of the tapped hole 4 is formed between the screwthread 11 and the portion 10 of smaller diameter. Inversely, the screwthread 9 could be a right-hand screwthread and the screwthread 11 a left-hand screwthread.

The block 5 is cylindrical and hollow and has, in a part of its outer surface, a screwthread 12 corresponding to the screwthread 11 and consequently being in this embodiment a right-hand screwthread. The hollow block 5 has in its inner surface a number N of axially extending splines.

The screw 3 is hollow and its outer screwthread 19 corresponds to the screwthread 9 of the hole 4 and is consequently in this embodiment a left-hand screwthread. This screw has a head 13 in the shape of a nut, for example a hexagonal head, and has in its inner surface, which has the same diameter as the inside diameter of the block 5, a number N of axially extending splines which are identical to the inner splines of the block 5.

The rod 6 is a screwthreaded rod which has in its outer surface a number N of splines which extend axially and are identical to the inner splines of the block 5 and screw 3.

In order to block the screw 3 with a given torque and thereby fix the part 1 to the part 2, the block 5 is first inserted in the hole 4 by using for example a tool 14 such as shown in FIG. 2 which consists of a cylindrical rod having outer splines 15 identical to but slightly undersize relative to the inner splines of the block 5 and screw 3 and which is advantageously provided with a pin 16 which is an interference fit in an aperture in the vicinity of one end of the rod.

The block 5 is screwed in the portion 10 of the hole by means of the tool 14 whose splines are brought into engagement with the inner splines of the block. The latter is screwed until its end abuts against the end of the hole.

The tool 14 is then withdrawn from the block and the part 1 is placed on the part 2 by means of the screw 3 which is then screwed and locked for example by means of a dynamometric spanner with the desired torque.

The keying rod 6 is then inserted in the splines of the screw 3 which are brought in alignment with the inner splines of the block 5 by very slightly rotating the screw 3 in one direction or the other so as to urge the rod 6 through the block 5 after having withdrawn the rod 14. It is advantageous to employ the rod 14 to carry out the alignment operation, a clearance being provided between the splines of this rod and those of the screw 3 and block 5.

The rod 6 is then immobilized in the head 13 of the screw 3 by means of an ordinary split pin 7 which is disposed through an aperture 17 extending through the head of the screw and through a radial aperture provided on a diameter of the rod 6. It will be understood that it is sufficient to slide rod 6 in the screw and in the block so as to bring its pin passage aperture in alignment with the aperture 17 of head of the screw, the rod 6 being free to slide inside the block and the screw. The end portions of the split pin 7 are then folded in the conventional manner outside the head of the screw so as to prevent the pin from escaping.

It will be understood that the screw 4 is then positively locked in position owing to the fact that any tendency of the screw to unscrew itself would result in a rotation of the rod 6 owing to its engagement with the splines of the latter. As the screwthread of the block 5 is of opposite direction to that of the screw 3, any tendency on the part of the latter to unscrew itself would also tend to rotate the block 5 through the splines which are engaged with those of the rod 6 and rotate it in the direction of the tightening thereof since its screwthread is of the opposite direction. As the end of the block 5 is already in contact with the inner end of the hole, the block is thus locked in position and the screw cannot unscrew itself.

It will be understood that as the pin 7 is solely intended to prevent the rod 6 from sliding axially out of the screw, it is subjected to no force.

In order to disassemble the unit and unscrew the screw 3, it is sufficient to withdraw the pin 7 and then withdraw the rod 6. For this purpose, a nut, such as that shown in dot-dash lines at 18 in FIG. 1, may be employed which is screwed on the screwthread of the rod 6 and extracts the latter from the screw 3 by bearing against the head 13.

It will be understood that a plurality of apertures may be provided in the rod 6 for the passage of the pin 7, these apertures being in staggered relation so as to permit employing the device in holes having different depths. Likewise, it is possible to employ the rod 6 as a tool for the assembly of the device and for holding the screw and block stationary relative to each other by providing in the vicinity of one end of the rod 6 an additional aperture in which a pin may be engaged for tightening the block 5 in the end of the hole.

The device according to the invention may also be employed in an aperture which extends throughout the part 2, for example by extending the portion 10 of the hole 4. Indeed, as the block 5 is screwthreaded only in a part of its length, it can be brought to a locking position when it is screwed fully in the screwthread 11 and its screwthread 12 encounters the portion 10 of smaller diameter. In another embodiment (not shown in the drawing), the hole 4 may extend throughout the part 2 but has an inner shoulder against which the end of the block 5 abuts.

The number N of splines is sufficient to ensure that the required angle of rotation for bringing the splines of the screw in alignment with those of the nut is negligible relative to the desired tightening torque.

Having now described my invention what I claim as new and desire to secure by Letters Patent is:

1. A device for locking a screw in a hole in a member, said hole having a first tapped portion of a given hand of thread adjacent an entrance end of said hole in the member, a second tapped portion coaxial with said first tapped portion and located on a side of said first tapped portion remote from said entrance and having a thread hand which is opposed to the thread hand of said first tapped portion, a block having an external screwthread screwthreadly engaged in said second tapped portion and defining a first aperture extending longitudinally of the block, stop means interposed between the block and said hole for stopping longitudinal travel of the block in a direction away from said entrance, the screw having an external screwthread screwthreadedly engaged in said first tapped portion and defining a second aperture which extends longitudinally of the screw throughout the length of the screw, and a keying member extending longitudinally in said first aperture and second aperture and keyingly engaging said block and said screw for preventing relative rotation between the block and the screw.

2. A device as claimed in claim 1, wherein said stop means comprises a radially inwardly extending first shoulder in said hole and a radially outwardly extending second shoulder on the block, the second shoulder being in abutting relation to the first shoulder.

3. A device as claimed in claim 1 or 2, wherein said keying member has a non-circular cross-sectional shape and is engaged in said first aperture and second aperture which have a non-circular corss-sectional shape and are coaxial with said second tapped portion and said first tapped portion.

4. A device as claimed in claim 1 or 2, wherein said keying member is a splined rod and said first aperture and said second aperture have internal splines which are in engaging relation to the splines of the splined rod, said first aperture and said second aperture being coaxial with said second tapped portion and said first tapped portion.

5. A device as claimed in claim 1, wherein said first tapped portion has a diameter larger than the diameter of said second tapped portion.

6. A device as claimed in claim 1, wherein said second tapped portion has a start which is spaced from said first tapped portion.

7. A device as claimed in claim 12, wherein the screwthread of the block extends only on a part of the length of the block and said second shoulder is defined between the screwthread of the block and a part of the block which is not screwthreaded.

8. A device as claimed in any one of the claims 1 to 4, wherein said keying member has an external screwthread and extends out of the screw for screwthreaded engagement with a nut when it is desired to extract the keying member from the screw and block.

9. A device as claimed in any one of the claims 1 to 4, wherein the keying member comprises at least one transverse aperture and the screw has a transverse aperture and a removable stop pin extends through the two transverse apertures for retaining the keying member.

* * * * *